(12) United States Patent
Wulf

(10) Patent No.: US 11,529,716 B1
(45) Date of Patent: Dec. 20, 2022

(54) TOOL TO ASSIST MOVEMENT OF TUBULAR OBJECTS

(71) Applicant: Ronald J. Wulf, Sioux Falls, SD (US)

(72) Inventor: Ronald J. Wulf, Sioux Falls, SD (US)

(*) Notice: Subject to any disclaimer, the term of this patent is extended or adjusted under 35 U.S.C. 154(b) by 0 days.

(21) Appl. No.: 17/828,192

(22) Filed: May 31, 2022

Related U.S. Application Data

(60) Provisional application No. 63/196,288, filed on Jun. 3, 2021.

(51) Int. Cl.
*B25B 7/02* (2006.01)
*B25B 7/08* (2006.01)

(52) U.S. Cl.
CPC ............ *B25B 7/02* (2013.01); *B25B 7/08* (2013.01); *B65G 2201/0276* (2013.01)

(58) Field of Classification Search
CPC .......... B25J 15/0047; B66C 1/54; B66C 1/56; B66C 1/442; B65G 2201/0276; B25B 7/02; B25B 7/08
USPC .................................. 294/97; 414/910, 911
See application file for complete search history.

(56) References Cited

U.S. PATENT DOCUMENTS

| | | | | |
|---|---|---|---|---|
| 1,067,195 A * | 7/1913 | Raithel | ............... | B66C 1/54 81/302 |
| 2,769,358 A * | 11/1956 | Hill | ............... | B21D 39/06 72/392 |
| 2,794,669 A * | 6/1957 | Schardinger | ............... | B66C 1/54 294/97 |
| 3,758,146 A | 9/1973 | Kaercher, Jr. | | |
| 4,496,179 A | 1/1985 | Ogle | | |
| 5,014,407 A * | 5/1991 | Boughten | ............... | B25B 7/02 29/857 |
| 5,371,658 A * | 12/1994 | Christie | ............... | B25B 7/18 362/120 |
| 5,797,637 A | 8/1998 | Ervin | | |
| 6,270,133 B1 | 8/2001 | Babcock | | |
| 7,007,992 B2 * | 3/2006 | Young | ............... | B66C 1/54 294/119 |
| 7,669,905 B1 * | 3/2010 | Kondo | ............... | B66C 1/54 294/97 |
| 9,126,757 B2 | 9/2015 | Dunham | | |
| 9,598,915 B1 | 3/2017 | Cogburn, Jr. | | |

(Continued)

FOREIGN PATENT DOCUMENTS

FR 0311859 4/2005
KR 101492775 B1 * 2/2015

*Primary Examiner* — Dean J Kramer
(74) *Attorney, Agent, or Firm* — Jeffrey A. Proehl; Woods, Fuller, Shultz & Smith, PC

(57) ABSTRACT

A tool for facilitating movement of an object having a channel may include a pair of device members movably connected to each other to move between an engagement condition in which the device members engage the channel and a disengagement condition in which the device disengage from the channel. The device members may be connected together in a manner such that movement of the handle ends of the device members toward each other results in movement of the engagement ends of the device members away from each other. The tool may include a primary grip structure on each device member and configured to engage a first set of opposite portions of the channel, and a secondary grip structure on each device members and configured to engage a second set opposite portions of the channel.

18 Claims, 2 Drawing Sheets

(56) References Cited

U.S. PATENT DOCUMENTS

2004/0251699 A1 12/2004 Kehl
2006/0000323 A1 1/2006 Kehl

* cited by examiner

TOOL TO ASSIST MOVEMENT OF TUBULAR OBJECTS

REFERENCE TO RELATED APPLICATIONS

This application claims the priority benefit of U.S. Provisional Patent Application No. 63/196,288, filed Jun. 3, 2021, which is hereby incorporated by reference in its entirety.

BACKGROUND

Field

The present disclosure relates to tools and more particularly pertains to a new tool to assist movement of tubular objects which can provide a convenient and secure engagement with the object for moving an elongated object longitudinally and laterally.

SUMMARY

In one aspect, the present disclosure relates to a tool for facilitating movement of an object having a channel formed by an inner surface. The tool may comprise a pair of device members movably connected to each other to move between an engagement condition and a disengagement condition. The engagement condition of the device members may be configured to engage the channel of the object, and the disengagement condition of the device members may be configured to disengage from the channel of the object. Each device member may have opposite ends, with one of the opposite ends being a handle end and another of the opposite ends being an engagement end. The device members may be connected together in a manner such that movement of the handle ends of the device members toward each other results in movement of the engagement ends of the device members away from each other. The tool may also comprise a primary grip structure on each of the device members, with the primary grip structures of the device members being configured to engage a first set of the opposite portions of the inner surface of the channel when the device members are in the engagement condition and each comprising at least one primary tooth. The tool may also include a secondary grip structure on each of the device members, with the secondary grip structures of the device members being configured to engage a second set of the opposite portions of the inner surface of the channel when the device members are in the engagement condition and each comprising at least one secondary tooth.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 2:
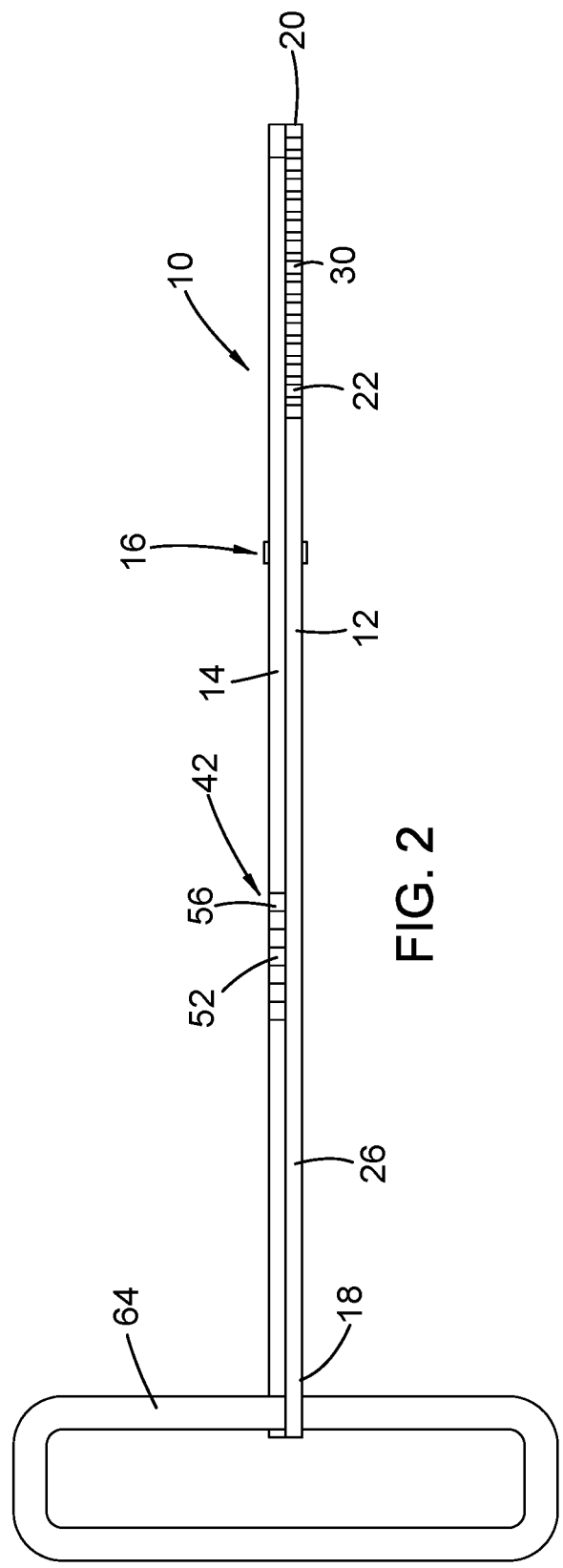
FIG. 2 is a schematic top view of the tool, according to an illustrative embodiment.
Figure 1:
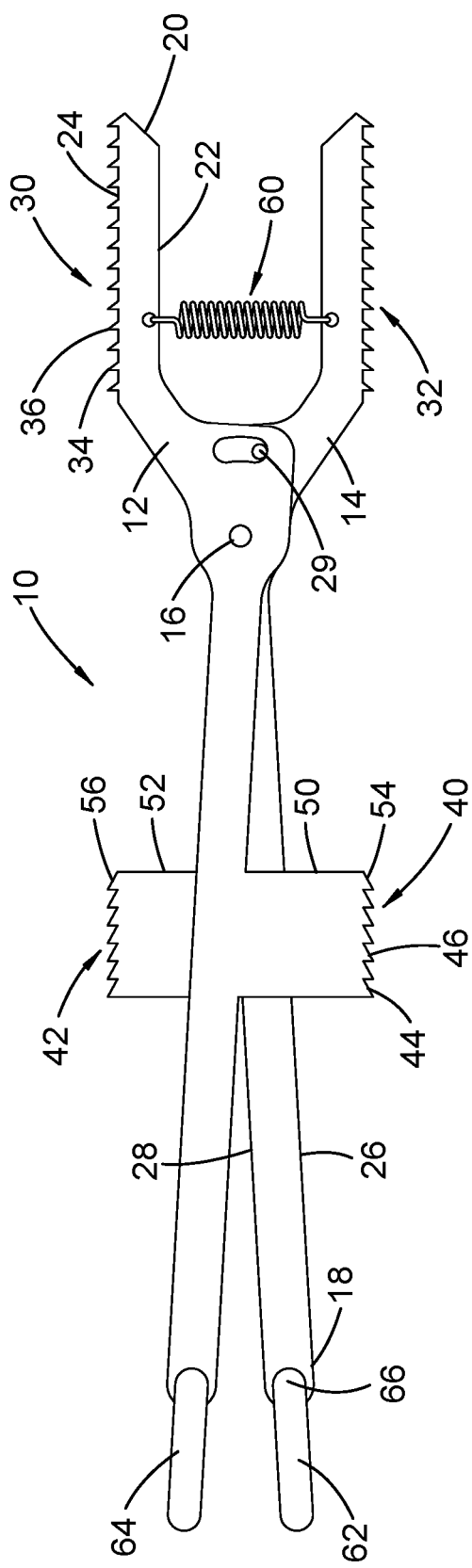
FIG. 1 is a schematic side view of a new tool to assist movement of tubular objects according to the present disclosure, shown in the engagement condition.
Figure 3:
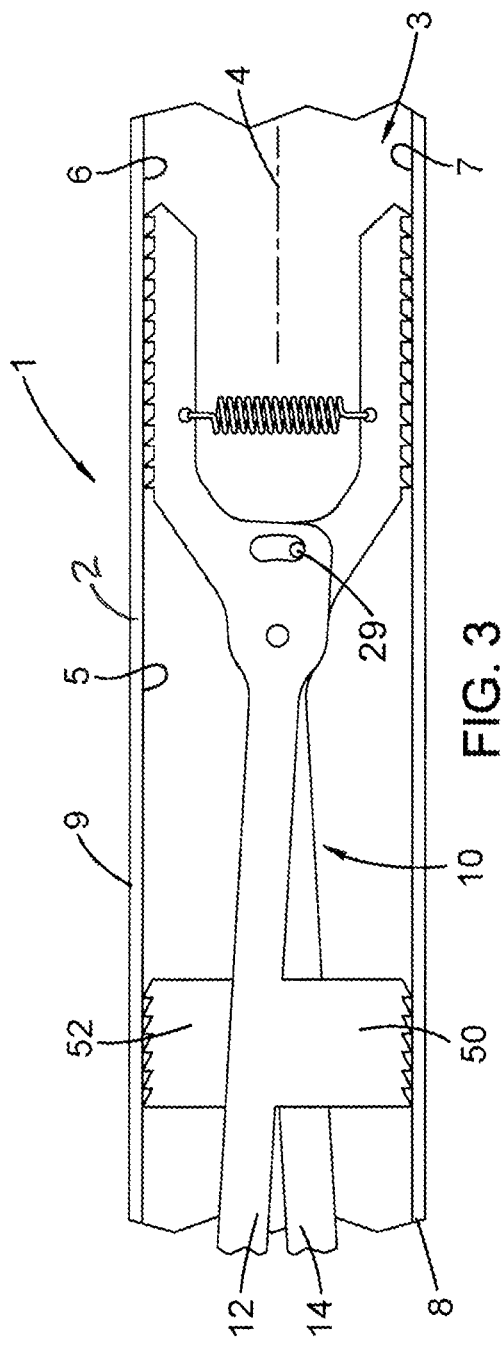
FIG. 3 is a schematic side view of a portion of the tool positioned in the channel of the object, according to an illustrative embodiment.
Figure 4:
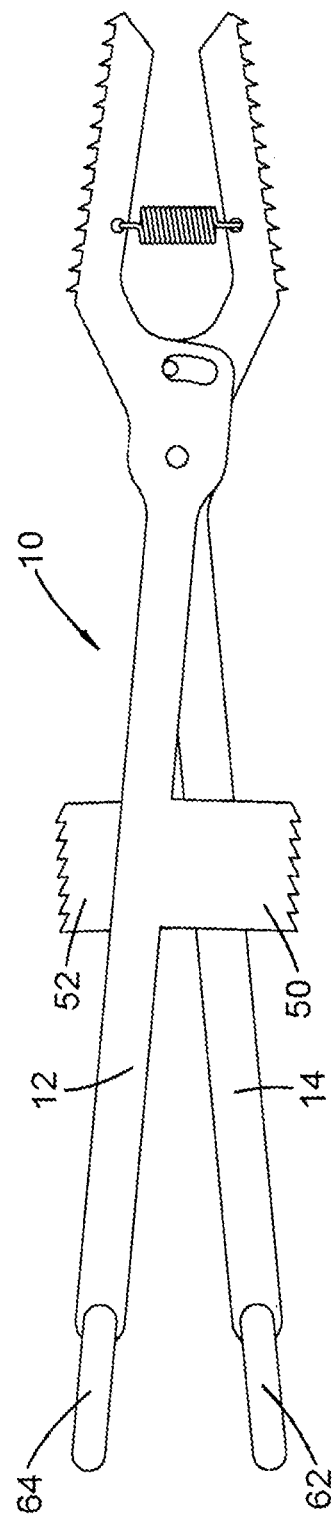
FIG. 4 is a schematic side view of the tool in a disengagement condition, according to an illustrative embodiment.

With reference now to the drawings, and in particular to FIGS. 1 through 4 thereof, a new tool to assist movement of tubular objects embodying the principles and concepts of the disclosed subject matter will be described.

In one aspect, the disclosure relates to a system 1 which may broadly include an object 2 to be moved by a person, and typically is elongated in shape and often is heavy in weight such that the object cannot be fully lifted by one person, but may be of a weight that permits a person to partially lift an end of the object. The object 2 may have a channel 3 which extends into the object and may extend through the object. The channel 3 may be elongated along a first axis 4. The channel 3 may be tubular with an inner surface 5 which has opposite portions 6, 7 positioned in opposition to each other with a portion of the void of the channel interior therebetween. The opposite portions 6, 7 of the inner surface 5 may be oriented substantially parallel to each other, although the portions of the inner surface are not usually planar in shape. In many implementations, the inner surface 5 may be substantially cylindrical in shape. The object 2 may have an opening 8, and the channel 3 may extend from the opening into the object.

In some embodiments, the object 2 may include a tubular core 9 which defines the channel 3, and the core 9 may be formed of a fibrous material or other material having a degree of softness or penetrability which is not so hard as to be impenetrable. Illustratively, the fibrous material may include paper fibers, and comprise a "cardboard" such as paperboard or even corrugated fiberboard. In one highly preferred implementation of the disclosure, the object 2 includes the tubular core and a sheet of material coiled about the tubular core, such as, for example, carpet or other type of floor covering products, although those skilled in the art will recognize the applicability of the disclosure to other types of objects.

The system 1 may further include a tool 10 either alone or in combination with the object 2. Generally, the tool 10 may be advantageous in facilitating movement of the object, particularly in the case of movement of the object in a direction substantially parallel to the first axis 4 of the channel 3 of the object, but also with regard to movement of the object in a direction substantially perpendicular to the first axis 4. The tool 10 may be configured to engage the object 2 via the channel 3, such as by at least partial insertion of the tool into the channel. The tool 10 may be configured to engage the inner surface 5 of the channel, and typically contact diametrically opposite locations on the opposite portions 6, 7 of the inner surface.

In some embodiments, the tool 10 may comprise a pair of device members 12, 14 which are connected together in a manner which permits movement of the device members with respect to each other. The pair of device members 12, 14 may be movable between an engagement condition (see, e.g., FIGS. 1 and 3) and a disengagement condition (see, e.g., FIG. 4). In the engagement condition, the device members 12, 14 may be configured to engage the channel 3 of the object, and in the disengagement condition, the device members may be configured to disengage from the channel 3 of the object.

The pair of device members 12, 14 may be pivotally connected such that the device members pivot with respect to each other, and may be connected at a pivot joint 16. Each of the device members 12, 14 may be elongated in a longitudinal direction of the respective device member, and each member may have opposite ends 18, 20. One of the opposite ends may comprise a handle end 18 and another of the opposite ends may comprise an engagement end 20. The pivot connection of the device members 12, 14 may be characterized by the movement of the handle ends 18 of the device members toward each other causing or resulting in movement of the engagement ends 20 away from each other. Illustratively, each of the device members 12, 14 may be formed from plate material with substantially flat faces, although other shapes may also be suitable. Optionally, the engagement ends 20 of the device members 12, 14 may taper narrower and may form a point or tip which may facilitate penetration by the ends 20 any film covering the opening 8 at the end of the tubular core 9, when such film is present.

Each of the device members 12, 14 may include an engagement end portion 22 located toward the engagement end 20 of the device member, and the engagement end portion may have an outward lateral edge 24. The outward lateral edge 24 of the device members 12, 14 may be oriented substantially parallel to each other when the device members are in the engagement condition. Each of the device members 12, 14 may also include a handle end portion 26 located toward the handle end of the device member. The handle end portion 26 may have an inward lateral side 28. Optionally, the tool 10 may have structure for limiting the movement of the device members 12, 14 with respect to each other. Illustratively, one device member 14 may have a stop peg 29 positioned in a slot of the other device member 12 such that the ends of the slot limit movement of the stop peg in the slot when the device members are moved toward the engagement condition or toward the disengagement condition.

Each of the device members 12, 14 may further include a primary grip structure 30, 32 located on each of the device members. The primary grip structures 30, 32 may be configured to engage a first set of the opposite portions 6, 7 of the inner surface 5 of the channel 3 when the device members are in the engagement condition. The primary grip structures 30, 32 may be located toward the engagement ends 20 of the device members, and may be located on the engagement end portions 22 of the device members. The primary grip structures 30, 32 may each comprise at least one primary tooth 34 which may be located on the outward lateral edge 24 of the respective device member, and may be integrally formed with the respective device member. In some of the most preferred embodiments, a plurality of the primary teeth 34, 36 may be formed on the outward lateral edges 24 of the respective device members. Illustratively, the plurality of primary teeth 34, 36 may form a serration or serrated edge. The teeth 34, 36 may have a shape which is directed to a degree toward the handle end of the respective device member. In optional embodiments, gripping caps or sleeves formed of a pliable or elastomeric material may be positioned over a portion of the engagement end portions 22 of the device members to facilitate gripping of the inner surfaces 5 of a channel 3 in which the tubular core 9 is not formed of a material which is at least partially penetratable by the primary teeth 34, 36 by enhancing friction between the gripping caps or sleeves on the members 12, 14 and the inner surface 5.

Additionally, each of the device members may also include a secondary grip structure 40, 42 located on each of the device members 12, 14. The secondary grip structures 40, 42 of the device members may be configured to engage a second set of the opposite portions 6, 7 of the inner surface 5 of the channel when the device members are in the engagement condition, and typically when the primary grip structures 30, 32 are also engaged with the first set of the opposite portions of the inner surface 5. The secondary grip structures 40, 42 may be located toward the handle ends 18 of the device members, and may be located on the handle end portions 26 of the members 12, 14. The secondary grip structures 40, 42 of the device members may be configured to move laterally outward when the device members 12, 14 are moved toward the engagement condition. The secondary grip structures may comprise at least one secondary tooth 44, and may comprise a plurality of secondary teeth 44, 46. Illustratively, the plurality of secondary teeth may form a serration or serrated edge. The teeth 44, 46 may have a shape which is directed to a degree toward the handle end of the respective device member.

The secondary tooth or teeth associated with each device member may be formed on an extension element 50, 52 which extends from the respective device member. In some embodiments, the extension element 50 on one device member 12 may extend across and bypass the other device member 14. Each extension element 50, 52 may have an outboard lateral edge 54, 56, with the teeth formed thereon, and the outboard lateral edges associated with the device members may be oriented substantially parallel to each other in the engagement condition of the device members 12, 14. The engagement condition of the pair of device members 12, 14 may be characterized by a lateral distance between the plurality of primary teeth 34 of the primary grip structures 30, 32 being substantially equal to a lateral distance between the plurality of secondary teeth 44 of the secondary grip structures 40, 42 to facilitate substantially simultaneous contact between the primary grip structures with the opposite portions 6, 7 and the secondary grip structures with the opposite portions 6, 7 of the inner surface 5. Illustratively, the extension elements 50, 52 are integral with the respective device members 12, 14, and may be formed out of the same piece of material forming the respective device member. Optionally, the extension elements 50, 52 may be formed from separate pieces of material and mounted on the device members.

The tool 10 may also include a biasing element 60 which biases the engagement ends 20 of the device members 12, 14 toward each other, and tend to resist movement of the engagement ends of the device members away from each other, unless the force is applied, such as force applied by the hands of the user, to the device members. The biasing element 60 may comprise a tension spring attached to locations on the engagement end portions 22 of the device members, although those skilled in the art will recognize that other positionings on the device members may produce similar effects. The tension spring may be in an extended condition when the device members 12, 14 are moved toward the engagement condition, and the tension spring may be in a retracted condition when the device members are moved toward the disengagement condition.

The tool 10 may further include a loop handle 62, 64 mounted on each of the device members 12, 14. Each loop handle 62, 64 may be mounted on the handle end portion 26 of the respective device member. The loop handles 62, 64 on the device members may be moved toward each other in the engagement condition of the device members, such as by the application of force to the handles by the hands of the user. The loop handles 62, 64 may permit the user to grip both of the loop handles with one or both hands to move the handles towards each other as well as maintain the proximity of the handles to each other (as well as the resulting engagement with the tube) while the user is pulling on or lifting the tool 10 to position the object. Conversely, movement of the loop handles 62, 64 away from each other tends to move the device members toward the disengagement condition to release the engagement of the device members with the object 2. Each of the loop handles 62, 64 may extend from the handle ends 18 of the device members 12, 14 on which the respective loop handle is mounted. Illustratively, an aperture 66 may be formed in the handle end portion of each of the device members 12, 14 to receive a portion of the loop handle for mounting the handle on the respective device member. Optionally, the loop handles 62, 64 may be of a size which accommodates a pair of hands extending through each of the handles, so that both hands of the user or a hand of two users may engage the loop handles simultaneously to facilitate the lifting and/or pulling of relatively heavier objects.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A tool for facilitating movement of an object having a channel formed by an inner surface, the tool comprising:
 a pair of device members pivotally connected to each other at a pivot to move between an engagement condition and a disengagement condition, the engagement condition of the device members being configured to engage the channel of the object, the disengagement condition of the device members being configured to disengage from the channel of the object, each device member having opposite ends, one of said opposite ends being a handle end and another of said opposite ends being an engagement end, the device members being connected together in a manner such that movement of the handle ends of the device members toward each other results in movement of the engagement ends of the device members away from each other;
 a primary grip structure on each of the device members between the pivot and the engagement end of the respective device member, the primary grip structures of the device members being configured to engage a first set of opposite portions of the inner surface of the channel when the device members are in the engagement condition, the primary grip structures each comprising at least one primary tooth; and
 a secondary grip structure on each of the device members between the pivot and the handle end of the respective device member, the secondary grip structures of the device members being configured to engage a second set of opposite portions of the inner surface of the channel when the device members are in the engagement condition, the secondary grip structures each comprising at least one secondary tooth;
 wherein the device members are configured such that the at least one primary tooth of each of the primary grip structures pivot about the pivot when the device members move between the engagement and disengagement conditions and the at least one secondary tooth of each of the secondary grip structures pivot about the pivot when the device members move between the engagement and disengagement conditions.

2. The tool of claim 1 wherein each of the device members includes an engagement end portion located toward the engagement end of the device member and having an outward lateral edge, the outward lateral edge of one said device member being oriented substantially parallel to the outward lateral edge of the other said device member in the engagement condition of the device members.

3. The tool of claim 2 wherein the at least one primary tooth of each primary grip structure is located on the outward lateral edge of the respective device member.

4. The tool of claim 1 wherein one of the device members has a stop peg and an other one of the device members has a slot, the stop peg of the one device member being positioned in the slot of the other device member such that ends of the slot limit movement of the stop peg in the slot when the device members are moved toward the engagement condition and when the device members are moved toward the disengagement condition.

5. The tool of claim 1 wherein the primary grip structures of the device members are located toward the engagement ends of the device members.

6. The tool of claim 1 wherein the secondary grip structures of the device members are configured to move laterally outward when the device members are moved toward the engagement condition.

7. The tool of claim 6 wherein the secondary grip structures of the device members are located toward the respective handle ends of the device members.

8. The tool of claim 1 wherein the at least one secondary tooth associated with each device member is formed on an extension element extending laterally from the respective device member.

9. The tool of claim 8 wherein each extension element has an outboard lateral edge, the outboard lateral edge associated with one said device member being oriented substantially parallel to the outboard lateral edge of the other said device member in the engagement condition of the device members.

10. The tool of claim 9 wherein the at least one secondary tooth is formed on the outboard lateral edge of the extension element.

11. The tool of claim 1 wherein the at least one primary tooth comprises a plurality of primary teeth and the at least one secondary tooth comprises a plurality of secondary teeth.

12. The tool of claim 1 additionally comprising a biasing element biasing the engagement ends of the device members toward each other.

13. The tool of claim 12 wherein the biasing element resists movement of the engagement ends of the device members away from each other.

14. The tool of claim 1 additionally comprising a loop handle mounted on each of the device members, the loop handles on the device members being moved toward each other in the engagement condition of the device members and away from each other in the disengagement condition of the device members.

15. The tool of claim 14 wherein each of the loop handles is mounted on and extends laterally from the respective device member toward the handle end thereof.

16. A tool for facilitating movement of an object having a channel formed by an inner surface, the tool comprising:
a pair of device members movably connected to each other to move between an engagement condition and a disengagement condition, the engagement condition of the device members being configured to engage the channel of the object, the disengagement condition of the device members being configured to disengage from the channel of the object, each device member having opposite ends, one of said opposite ends being a handle end and another of said opposite ends being an engagement end, the device members being connected together in a manner such that movement of the handle ends of the device members toward each other results in movement of the engagement ends of the device members away from each other;
a primary grip structure on each of the device members, the primary grip structures of the device members being configured to engage a first set of opposite portions of the inner surface of the channel when the device members are in the engagement condition, the primary grip structures each comprising at least one primary tooth; and
a secondary grip structure on each of the device members, the secondary grip structures of the device members being configured to engage a second set of opposite portions of the inner surface of the channel when the device members are in the engagement condition, the secondary grip structures each comprising at least one secondary tooth;
wherein the engagement condition of the pair of device members is characterized by a lateral distance between the at least one primary teeth of the device members are substantially equal to a lateral distance between the at least one secondary teeth of the device members.

17. The tool of claim 16 wherein the pair of device members are pivotally connected such that the device members pivot with respect to each other.

18. A tool for facilitating movement of an object having a channel formed by an inner surface, the tool comprising:
a pair of device members movably connected to each other to move between an engagement condition and a disengagement condition, the engagement condition of the device members being configured to engage the channel of the object, the disengagement condition of the device members being configured to disengage from the channel of the object, each device member having opposite ends, one of said opposite ends being a handle end and another of said opposite ends being an engagement end, the device members being connected together in a manner such that movement of the handle ends of the device members toward each other results in movement of the engagement ends of the device members away from each other;
a primary grip structure on each of the device members, the primary grip structures of the device members being configured to engage a first set of opposite portions of the inner surface of the channel when the device members are in the engagement condition, the primary grip structures each comprising at least one primary tooth; and
a secondary grip structure on each of the device members, the secondary grip structures of the device members being configured to engage a second set of opposite portions of the inner surface of the channel when the device members are in the engagement condition, the secondary grip structures each comprising at least one secondary tooth;
wherein the at least one secondary tooth associated with each device member is formed on an extension element extending laterally from the respective device member; and
wherein the extension element on one said device member extends across the other said device member.

* * * * *